United States Patent [19]
Karr

[11] 3,993,862
[45] Nov. 23, 1976

[54] DATA COMPRESSION

[76] Inventor: Lawrence Karr, 220 Horizon Ave., Venice, Calif. 90291

[22] Filed: July 5, 1974

[21] Appl. No.: 485,810

[52] U.S. Cl. .............................. 178/6; 178/DIG. 3; 178/66 A; 325/30
[51] Int. Cl.² .................... H04N 5/38; G01N 27/42; H04L 27/00
[58] Field of Search .............. 178/DIG. 3, 66 R, 67, 178/6, 68; 325/30, 60, 61, 34 A; 340/347 DD

[56] References Cited
UNITED STATES PATENTS

| | | | |
|---|---|---|---|
| 2,963,551 | 12/1960 | Schreiber | 178/DIG. 3 |
| 3,414,677 | 12/1968 | Quinlan | 325/38 A |
| 3,585,504 | 6/1971 | Mumford et al. | 178/DIG. 3 |
| 3,723,641 | 3/1973 | Heinrich et al. | 178/DIG. 3 |

*Primary Examiner*—John C. Martin

[57] ABSTRACT

A facsimile system is explained on the basis of a single unit which is connected to a video pick-up device and to a facsimile reconstruction device. The video signal is converted into a two level signal and the lengths of runs of the same level are metered by counting increments of such run lengths and converted the count numbers into a stream of ternary digits to distinguish length numbers for the runs of different signal levels by digit notation. These ternary encoded run length numbers pass through a buffer for storage on tape. Upon retrieval they pass again through the buffer and are converted in groups of one or two ternary digits into seven symbols, used to phase and amplitude modulate a carrier for transmission. Carrier signals when received are demodulated and converted into ternary code signals, which are buffered and stored. Upon image reconstruction, the stored, ternary encoded run length numbers are retrieved, pass through the buffer and are used to re-establish a two level signal. The system and method as such is usable for data compression of any type of two level source signals.

37 Claims, 8 Drawing Figures

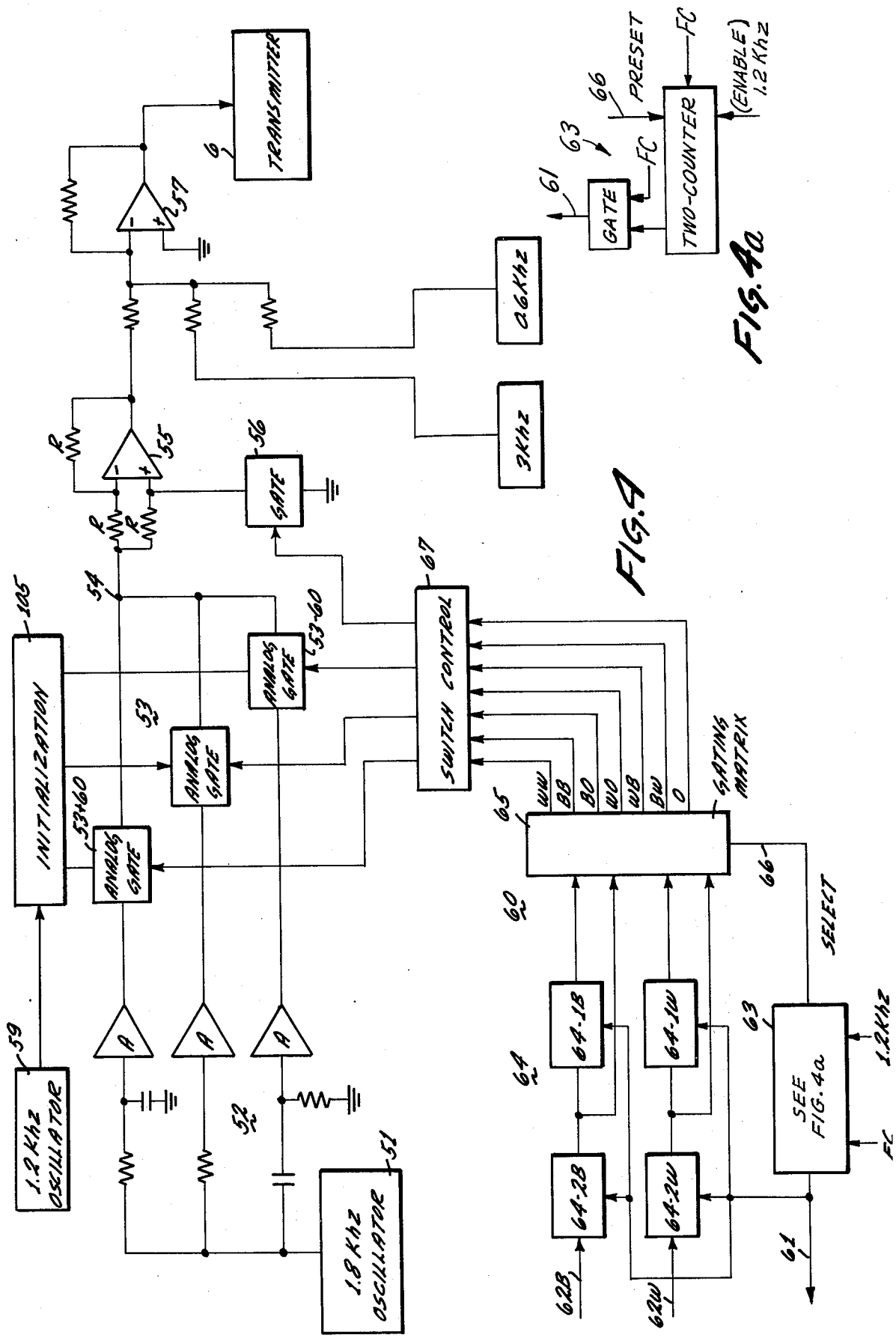

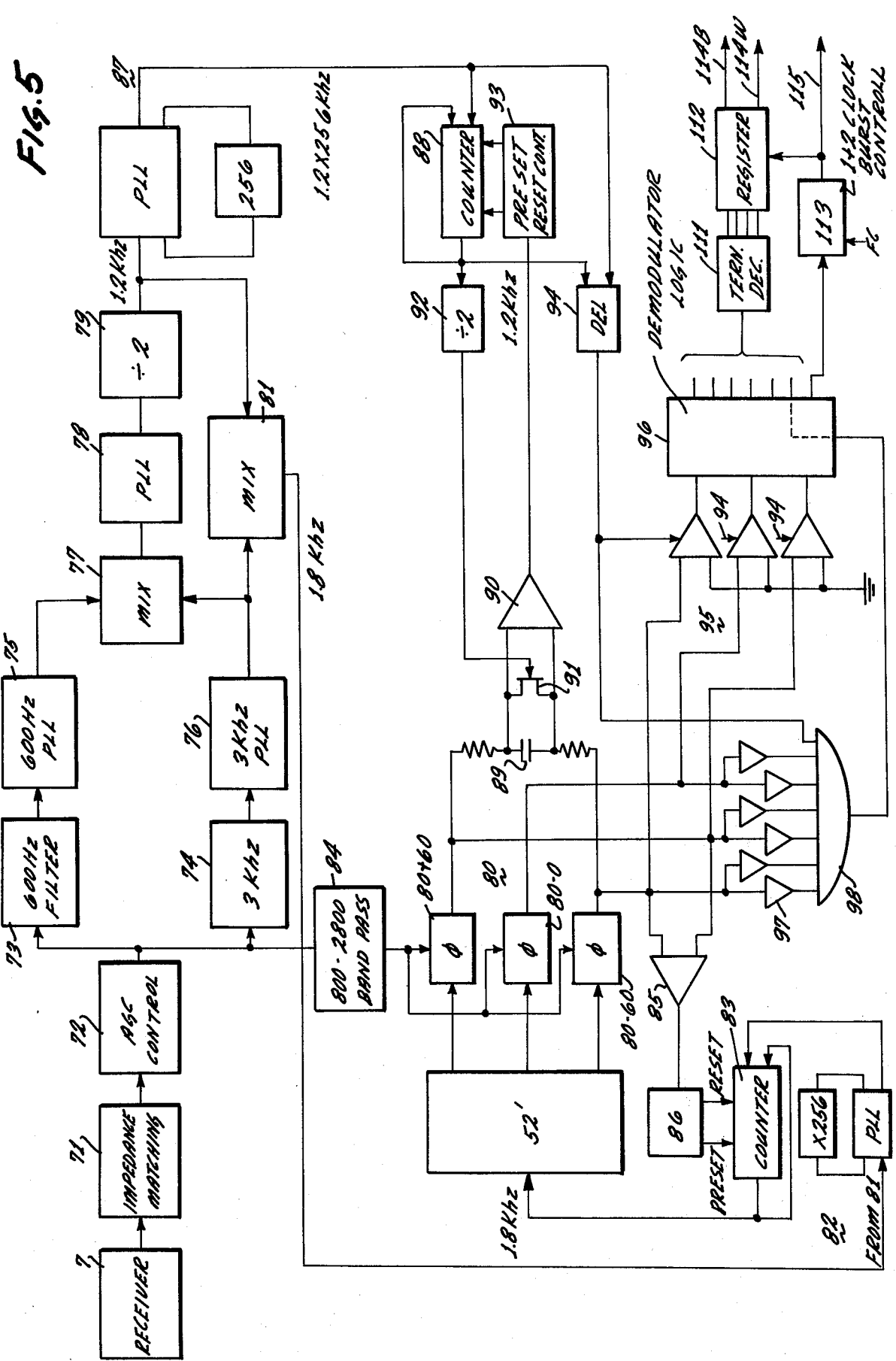

DATA COMPRESSION

BACKGROUND OF THE INVENTION

The present invention relates to the transmission of digital data in general and more particularly to the compression of source information which is or can be presented as a bi-level signal train. The invention was made pursuant to development of methods and systems for the transmission of facsimile data but is not limited thereto.

In the earlier phases of development of systems for transmission of facsimile data, one preceded usually by transmitting the scanned video information as a line scan signal which modulated a carrier. The same is true with regard to telemetric information. Since a considerable amount of facsimile data represents nothing but white space, various methods of data compression have been developed with the particular goal in mind to shorten the transmission time. Particularly here various schemes have been developed to avoid the transmission e.g. of long runs of white as video information. These data compression schemes are all based on statistical evaluation of video data. If one interprets video data as bi-level signals corresponding to dark and light contrasts digitization of a train of such signals will result in bi-valued bits respectively representing black and white image increments. The various data compression schemes replace such bits or sequences of bits with others, identifying the video information differently and, hopefully, in a manner that leads to a shorter length of a bit stream to be transmitted as compared with just straight forward transmission of image point by image point.

DESCRIPTION OF THE INVENTION

It is an object of the present invention to provide for a new method and system for compressing source data presented e.g. as two level signals (or convertible into a two level signal train).

It is another object of the present invention to provide for a new and improved scheme for compression of facsimile data in preparation for transmission of such data, and for corresponding "decompression"at the receiving end of the transmission.

It is still another object of the present invention to provide for a new and improved subsystem for processing video signals immediately when generated, storing them temporarily and particularly modulating the retrieved information immediately before transmission.

It is a further object of the present invention to provide for a new and improved operation for synchronizing a receiving facsimile unit with a transmitting unit on the basis of stored local reference information.

It is a still further object of the present invention to provide for a new organization of a system which includes a video generating and reconstructing subsystem, a modem and an interposed buffering and temporary storage system.

In accordance with the preferred embodiment of the present invention a system is suggested, in which a two level signal such as a video signal is first processed to obtain run length numbers of consecutive, alternating runs of the one and the other level, such as black and white, and presenting these numbers in ternary code. The resulting stream of ternary digits is buffered in a two-set-buffer system, one set being read into, while the other one empties its data into a recorder, e.g. a magnetic tape recorder. The two buffer sets alternate, until all ternary signals have been received, processed as stated and stored on tape. For transmission, the recorded data are retrieved and fed alternatingly again into the two sets of the buffer system while the respective other set empties into a modem which receives the stream of reproduced ternary digits and converts one or two consecutive digits into one of seven symbols. These symbols phase and amplitude modulate a carrier which is transmitted.

The receiving unit has a similar modem, which demodulates the carrier as received and provides a stream of ternary digits, which again pass through the analogous buffer prior to recording on tape. After transmission, the data are retrieved from tape, pass through the two-set-buffer system, and the ternary encoded, run length numbers are converted into control signals permitting reconstituting of the two level signal from which, for example, a facsimile image is constructed.

The ternary digits in each instance are represented by two parallel trains of bi-valued bits so that buffering and recording/retrieving is carried out in two channels. The conversion of ternary-to-symbols establishes a non-constant bit rate for the ternary digits in that six symbols are associated with two consecutive ternary digits and one symbol represents one digit. The seven symbols are represented by six different phases of the carrier and off (zero signal level). The symbol rate of transmission, however, is constant.

The non-constant ternary digit rate as implied is necessitated by the fact that nine combinations of two ternary digits are possible so that nine phases (or eight phases plus off) would be needed for using consistently one symbol for two consecutive digits. However, restriction to six phases (plus off) permits superior operation under poor signal to noise conditions, and the detection "window"for recognizing symbols in spite of phase errors is quite large as will be shown later in detail.

The transmission is accompanied by transmission of pilot tones, from which the carrier frequency and the symbol rate are extracted by the receiving modem. For purposes of synchronizing transmitter and receiver operation the transmitter transmits additional control information which includes one of the phases followed by two of the phases alternating at symbol rate. A carrier frequency reference is established by the receiving modem using the pilot tones as well as the one phase as transmittted. A carrier frequency representation is preliminarily generated out of the pilot tones, and its phase is adjusted in a servo-loop which is responsive to demodulation of the one phase.

The proper phase for sampling phase detectors in the modem is established by detecting the two different phases as transmitted in alternation, at symbol rate, and detection thereof is used in another servo-loop to pinpoint the best sampling instant for sequential symbols as represented by the phase modulated carrier of the data stream that follows the control information.

As a consequence of the several features of which the system is composed, two level data such as facsimile data is compressed and transmitted in a stream of symbols represented as phase and amplitude modulation of a carrier. The stream of symbols represents gapless concatenation of run length numbers alternating for e.g. runs of black and white without requiring additional information as to what kind of run length any such number represents. The ternary code is used so as to imply the type of run that is being represented by any of the numbers. Rising a non-constant data rate is further beneficial or shortening transmission time and has been chosen on the basis of a statistical analysis according to which predominantly symbols representing two ternary bits are transmitted.

The use of six phases plus off is beneficial for implementation in that for each phase used, the opposite one is also used, and for any phase when detected, the phase detectors for the respective +60° and −60° signals furnish half scale amplitude.

The utilization of a two set buffer is beneficial for compensating and buffering irregular data flow. The run length numbers are presented at a non-constant rate because generation is a metering process and depends on the length of what is being metered. The same is true for the reconstitution of the two level signal at the receiving end of the transmission. Alternating between two buffer sets for receiving information (ternary digits) while the respective other one outputs information previously received permits accommodating a large stream of data to flow through the system without being aware of the alternation, while the flow of such data to or from the respective other set involves always the tape unit, recording or retrieving data at a higher rate than the maximum possible data rate as provided or needed at the specific instant in the respective other unit (e.g. modem, facsimile pick-up or printout).

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4 is a more detailed block diagram of the ternary to seven symbol conversion and modulation in the modem of the system in FIG. 1;

FIG. 4a is a circuit diagram of a detail of FIG. 4.

FIG. 5 is a more detailed block diagram of the demodulation portion of the modem of the system in FIG. 1 showing particularly two servo-loops respectively for establishing a stored reference and for establishing sampling phase points;

Figure 1:
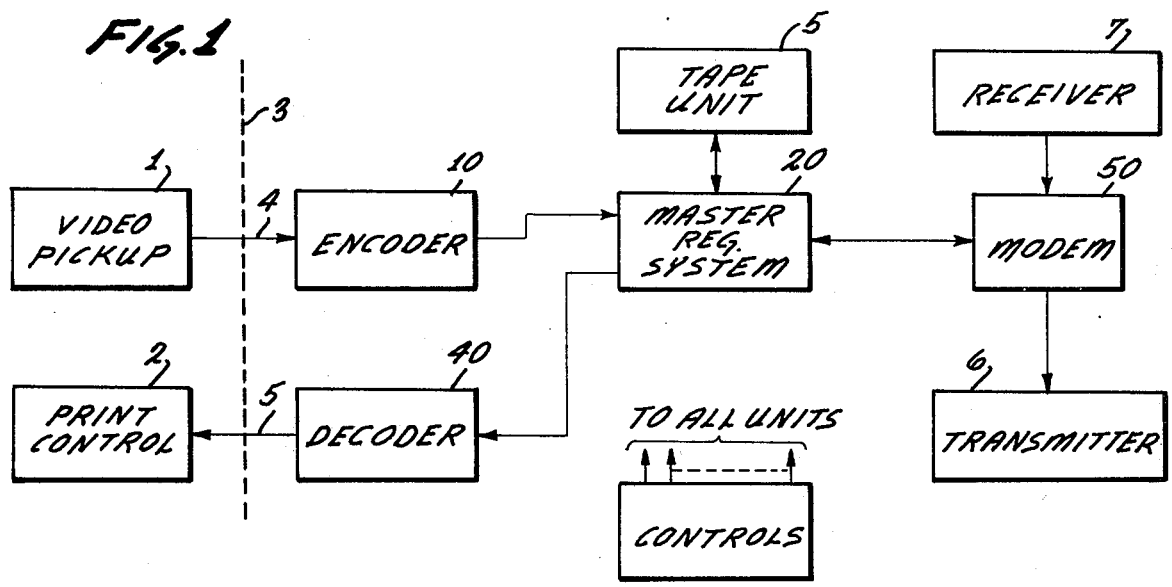
FIG. 1 is a block diagram of the system in accordance with one example of the preferred embodiment of the present invention.

Proceeding now to the detailed description of the drawings, the system as depicted in FIG. 1 includes or can be connected to a facsimile pick-up device 1 of known design and cooperating with suitable facsimile devices to obtain a line for line video scan resulting in a continuous train of electrical, vidio signals. Analogously a facsimile printer 2 is provided operating in response to an electrical signal train which represents optical contrasts, to provide a line for line facsimile reproduction.

Reference numeral 3 refers to a dividing line or interface whereby the equipment to the left of that line refers generally to known optical-to-electrical and electrical-to-visible conversion equipment. The system proper of this invention is depicted to the right of that interface line; it processes video signals suitably generated and provides electrical signals suitable for controlling the generation of a reproduction or printout.

Interface input line 4 as leading from video pick-up 1 provides video signals to an encoder 10 which converts these signals into a stream of ternary digits. Encoder 10 responds to the length of stretches or runs of white or lighter grey tones (interpreted as white) and to stretches or runs of black or darker grey tones (interpreted as black), and identifies digitally the length of such stretches or runs in ternary code with implied white/black significance of the several digits as identifying the length of runs of black and runs of white. The ternary digits will be defined by characters B, W and O, with B being equivalent to a binary 1 but being used only for numbers identifying the length of runs of black; a character W is equivalent to a binary 1 but is used only for numbers identifying length of runs of white, and 0 is zero in either case. Thus, numbers identifying the length of a run of white are represented by characters W and O, numbers identifying the length of a run of black are represented by characters B and O. A single character B represents the smallest black image increment on a scanning line that can be identified at all; a single character W represents the smallest white image increment on a scanning line. Details of encoder 10 are explained more fully with reference to FIG. 3.

The ternary digits are fed to a master register system 20 operating as temporary buffer before recording these bits in a tape unit 5. Ternary digits to be stored temporarily on the tape are provided thereto by the master register system 20, and data retrieved from the tape are always set first into the register system 20. Details of the master register and buffer system are explained also with reference to FIG. 3.

Little needs to be said about the tape unit 5 as any conventional multiple track tape storage facility can be used. It is an advantage of the inventive system that this tape unit does not have to meet any particularly critical requirements as to constancy of speed, band width, package density for data or the like. Other storage facility of the record/retrieval variety can be used here, such as a flexible disk. Moreover, accoustical delay lines or MOS type storage could be used in principle but are deemed less practical.

One could store the two bit streams as they are drawn from the register system in two tracks. It was found, however, preferable to record the three ternary character digits, B, W and O in three tracks. The ternary zero's are recorded in the third track by and-ing zero bits in the two channels and recording a ternary digit zero in the third track. Retrieval is analogously so that the system outside of the tape unit does not "see" the three tracks for storage.

Reference numeral 50 refers to a modem 50 which converts a stream of ternary digits as provided by the master register system 20 into a stream of symbols which in turn are used to modulate a carrier. Double side band phase modulated carrier signals are fed by modem 50 to a transmitter 6. Conversely, modem 50 demodulates a train of such carrier modulated signals when received from a receiver 7 and converts them into a stream of ternary digits.

A seven symbol system is used for respectively identifying seven different symbols by six different phase modulations, and one amplitude modulation separating the seventh symbol from the six other, phase modulated symbols. These seven symbols as generated in the modem can be written as and identified by the ternary digits they represent. They are O, BB, WW, BW, WB, BO and WO.

These symbols have the following connotation. O, of course, is just the digit of value zero, BB and WW are two consecutive non-zero digits respectively within a "black" and "white" run length defining number. BW and BO are the two possible transitions denoting the beginning of a black number as following a white number; each "white" run length defining number begins by necessity respectively with a W digit and each "black" run length defining number begins with a B digit. However the combination BO may also occur within a "black" run length defining number.

Analogously WB and WO are the two possible beginings of a white number as following a black number, but WO may occur also within a "white" run length number. Therefor, modem 50 converts the ternary digit stream as defining sequentially occurring numbers for alternating black and white run lengths, into a stream of seven symbols and phase modulates a carrier of 1.8khz accordingly. Moreover, the modem 50 provides the reverse conversion on a symbol modulated carrier it receives. Details of the modem as far as relevant for the invention are explained with reference to FIGS. 4 and 5.

Transmitter 6 and receiver 7 are conventional units of the variety as they are used e.g. in data transmission via telephone lines. Transmitter 6 is, therefor, comprised of a suitable electrical coupler, amplifiers, filters etc. Even though the modulation is deemed novel, the transmission of a double side band signal with a carrier of e.g. 1.8 kilohertz and a band width ranging from about 800 hertz to 2.8 khz is known per se and does not require elaboration.

Analogously the receiver 7 may include an accustic-to-electric transducer and may include equalizer circuitry of known design providing for a signal train that is more or less a replica of a signal train as transmitted elsewhere by another facsimile unit of like design.

The register unit 20 as well as tape unit 5 provide also for temporary storage of information that was received and demodulated by modem 50. For printout, the ternary digits are transferred from tape unit 5 via registers 20 to a decoder 40, basically providing for conversion of ternary encoded run length numbers into a bit stream representing a sequence of "print" and "no print" commands. A signal train is fed into output line 8, across interface 3, for control of facsimile printout by unit 2 accordingly. The decoder is also shown in greater detail in FIG. 3.

The system shows also a general control unit which could be understood more specifically as clock generating and gating unit combined with overall phasing and sequencing. Clock generation and gating involves primarily the input/ output operation of the master register system 20 and will be explained in conjunction therewith. As far as overall phasing and sequencing is concerned, the following general remarks suffice, primarily because manual intervention on one hand, and considerable subsystem autonomie on the other hand is well permitted within the purview of the inventive system.

Basically one can divide overall operation into four modes; (1) the encode-record mode; (2) the retrieve-transmit mode; (3) the receive-record mode; (4) the retrieve-reproduce mode. Whenever two facsimile units are to communicate, the first unit runs first through system mode No. 1, and thereafter through system mode No. 2 while the second unit runs through mode No. 4. During mode No. 1 facsimile information is accumulated and recorded on tape unit 5. The transmission of that information can occur later, at will, so that no automatic changeover from mode No. 1 to mode No. 2 has to be provided for. The same is true with regard to receiving and facsimile reproduction. The latter may occur at any time after all data have been received.

The overall operation, therefor, is as follows:

The video pick-up unit 3 scans a sheet and provides a signal train which is encoded in ternary format by encoder 10 generating alternating black run length and white run length defining numbers which follow each other in immediate sequence. The digits of the ternary digit stream are accumulated in register system 20 in data blocks, and transferred in blocks to the tape unit 5. The data are accumulated in that manner until the scanning of the sheet has been completed. Scan control may be an autonomous process, and it is merely necessary that the master register be "informed" on beginning and end of the flow of data. The transmitted signals are video signals only and do not include synchronizing signals as such identifying the lines individually. Rather, each scanning line begins (or ends) with a short run of black.

The transmission, mode 3, may be initiated automatically or at will by the user. For this, the tape in unit 5 is reversed and the retrieved ternary digits are fed to the buffer system 20 and transferred to modem 50 wherein the ternary digits are converted into seven symbols. The modem provides a train of signals in which six phases plus zero signal level are used for modulating a carrier in accordance with the seven symbols to permit transmission of the seven different symbols through six different phases of modulation and one amplitude modulation.

Figure 2:
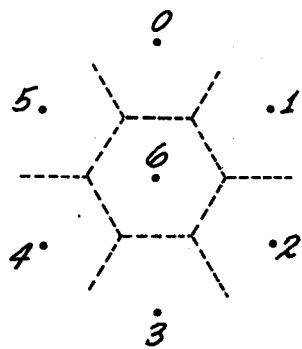
FIG. 2 is a phase diagram for explaining modulation as used in the system.
Figure 6:
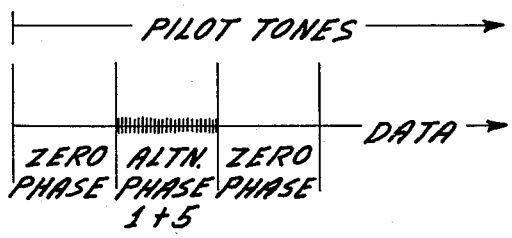
FIG. 6 is a timing diagram for illustrating initialization and synchronization between two transmitting and receiving modems.

FIG. 2 shows the phase diagram which is used here. The assignment of symbols to phases is basically arbitrary except that zero phase should represent the single ternary digit O symbol. The other six phases represent the groups WW, BB, BO, WO, BW and WB. Each symbol as transmitted in this manner includes one and one-half length of a 1.8 kilohertz wave, for a symbol frame of character rate of 1.2 kilohertz produced in continuous sequence. The symbol rate is a regular one, but six symbols represent two ternary digits, and one symbol (zero phase) represents only one ternary digit so that the bit rate of transmission is irregular. This is not a disadvantage, but intentionally provided for simply because the various chosen two digit combinations occur considerably more frequent than the non-chosen combinations requiring a leading O. On the other hand, it has to be considered that nine possible two digit combinations exist for three different types of ternary digit characters (W, B, O).

Using nine different symbols and nine different modulation phases is definitely a disadvantage for reasons of implementation and symbol discrimination on the receiver side. Moreover, any bit stream representing random numbers has more "ones" than "zeros," and "ones" occur as B or W in the ternary notation. Hence, the single symbol had to be a O but is used only when such O succeeds a single O or two digits converted into a single symbol.

As will be explained more fully below, the transmission of information (and retrieval from tape) is preceded and accompanied by the transmission of two pilot tones respectively of 600hz and 3 kilohertz. Additional control information is transmitted prior to the transmission of data, during a first period of time this additional control information is the phase zero signal. That zero phase signal is followed by alternatingly phase modulating the carrier with two specified symbols e.g. phases 1 and 5. This alternation between two non-zero phases persists for a certain period of time and precisely at the contemplated symbol rate. Thereafter zero symbol - zero phase is transmitted again now as a kind of preamble whereupon data follow.

A facsimile unit will receive these control signals and enters system mode No. 3 to prepare itself for demodulation and recording of the demodulated ternary digits. Specifically, a local carrier reference is derived from the pilot tones and phase corrected on the basis of the zero phase control signal. The sampling phase for data detection is also derived from the pilot tones and servo controlled initially through particular utilization of the alternating 1 – 5 phase signals.

The data symbols when received are demodulated and converted into a stream of ternary digits which are assembled in register system 20 and stored on tape. After the transmission has been terminated the tape content is retrieved pursuant to system mode No. 4 whereby the tape is again reversed so that the original order of presentation of encoded digits is restored.

The retrieved data is again buffered in unit 20 and decoded in 40. The decoder receives a stream of digits B, W and O which are numbers defining the lengths of black and white runs, and these numbers are converted into a stream of bi-valued decode bits representing print - no print commands and are passed to print control 2 for obtaining a facsimile printout.

The system permits ready generalization in that encoder 10 may receive any kind of two level signals of variable run length. These signals as received through interface line 4 can represent any kind of source data. Analogously, the signal train as provided in line 5 constitutes basically the source signal but reconstituted at a remote location. The rate of presentation may well differ from the rate of production.

Figure 3:
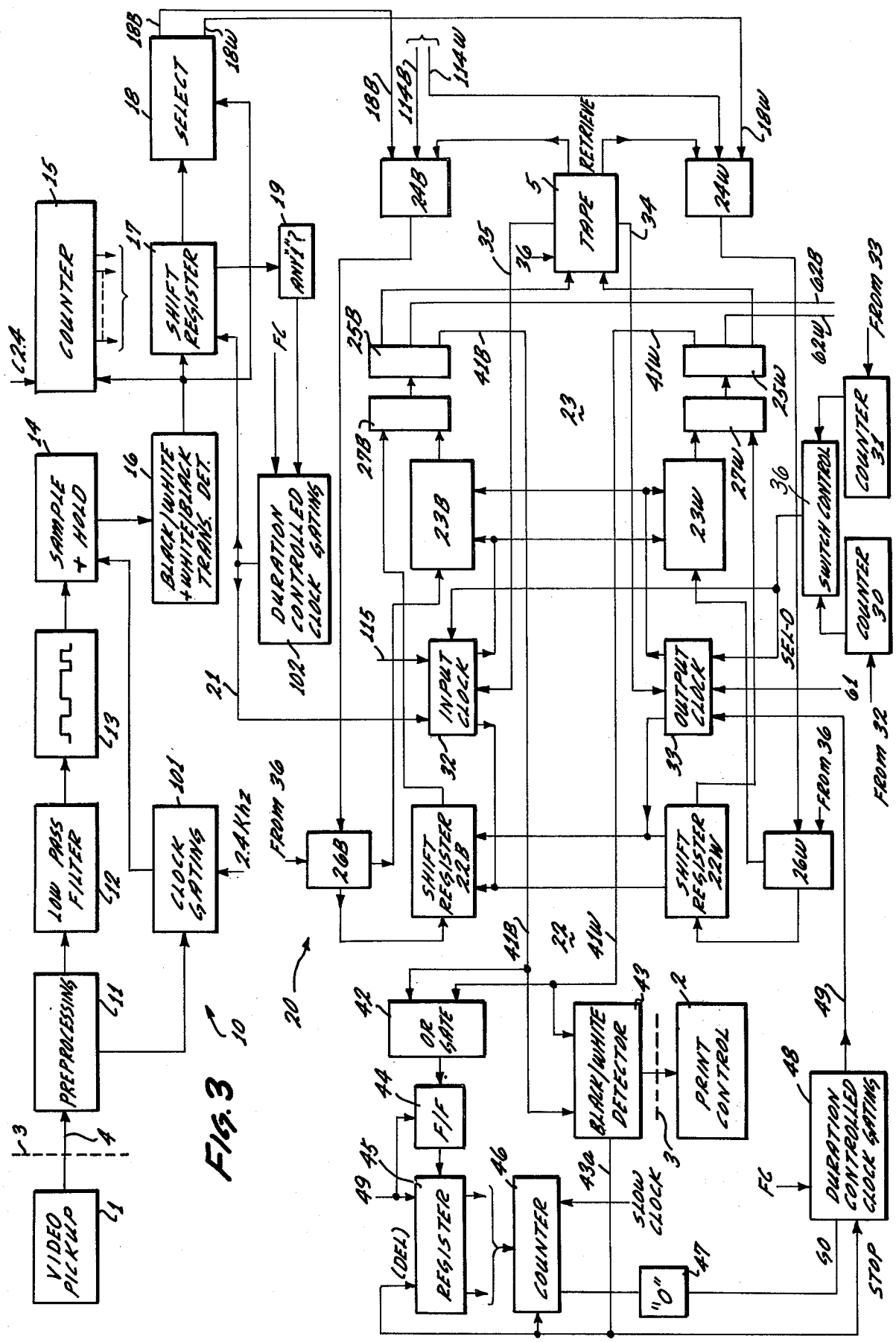
FIG. 3 is a more detailed block diagram of the encoder, buffer system and decoder of the system shown in FIG. 1.

Turning now to FIG. 3, the encoder 10 as shown therein is again illustrated as connected to pick-up 1 via connection 4 traversing (and establishing) interface 3. The video signal is preprocessed in a unit 11 which eliminates synch signals, if any and starts the video signal train by eliminating spurious signals which the pick-up may furnish in advance of the proper video signal.

The video signal is filtered at low pass filter 12 eliminating frequencies in excess of 1.8 kilohertz. A slicer, threshold or squaring circuit device 13 converts the video signal into a square wave, in that the signal levels below a threshold and representing white or light grey tones are clamped to a "white" level, while signal levels above that threshold represent dark contrasts and are clamped to a "black" level.

In order to provide for internal synchronization as between bit positions and information, the squared video signal is sampled in a circuit 14 operating in response to a 2.4khz clock signal locally produced by a conventional oscillator.

The sampling clock may be gated by a clock gating circuit 101 receiving a gating signal from preprocessor 11 in representation of presence of data. Such presence is either signalled separately by pick-up 1 or extracted from the stream of video signals as furnished. Therefor, sampling persists only for the duration of true data.

The same gated clock is applied to a counter 15 which counts these gated clock signals on a continuous basis. The reset signal for counter 15 is derived from a transition detector 16 which can be constructed as a bidirectional one-shot responding each time to the output of sample-and-hold circuit 14 changes state. The latter occurs on each end of a run of white as marking the beginning of the next run of black as well as in the end of each run of black as marking the beginning of the next run of white.

Therefor, counter 15 counts clock pulses for the duration of any run of white and of any run of black until the respective run ends whereupon the counter is reset and cleared, and the length of the respective opposite type of run is metered in that fashion. It can thus be seen that counter 15, just prior to being reset, holds a count number or run length defining number, in binary code, and indiscriminately as to whether the metered length was a run of white or a run of black.

The output of transition detector 16 is also used to clock the content of the counter 15, just prior to resetting, into a shift register 17, but in parallel-by-bit-format. The shift register receives shift clock pulses FC, also locally produced and having a frequency well in excess of the 2.4khz clock. In particular, the frequency of the clock FC (in kilohertz) should be at least as high as the highest number of bits expected to be transferred, times 2.4.

The largest number that can be expected is equivalent to the length of a completely black or completely white video scanning line and in units of image increments as defined by the resolution defining, 2.4khz sampling clock. Such a number may have length in the order ten bits. Therefor, the fast clock must produce at least that many clock pulses in between each two 2.4khz sampling clock pulses. It must be borne in mind that the smallest run length may consist of a single bit denoting the smallest length of white or black the system can resolve; therefore, register 17 must be empty before that can occur.

The binary numbers shifted out of register 17 pass to and through a selector gate assembly 18 which is the ternary code generator. The gate assembly 18 has two output channels 18-B and 18-W which are activated by the transition detector 16. Assembly 18 may include a toggle flip-flop changing state on each detected transition from black to white or white to black and enables one or another of two gates in alternating sequence, both gates receiving the shifted-out count bits but only one permitting passage.

In one instance the count number passed into circuit 18 represents the length (metered in image resolution increments) of a run of white in which case selector 18 converts the 1 bits of that number into digits W, just by setting a 1 bit into channel 18W. In the other instance the count number so transferred represents the length of a run of black, and selector 18 converts the 1 bits of that number into digits B, just by setting 1 bits into channel 18W. The respective other channel receives zero bits in each instance but that is, per se, not a zero of the ternary code. A zero in the ternary code requires zeros on both channels, 18W and 18B.

It can thus be seen that counter 15 meters sequentially, alternatingly but indiscriminately the lengths of runs of white and runs of black. Response of transition detector 16 clears the counter, thereby terminating metering of that particular run length, subsequent counting meters a run length of opposite type. The numbers are distinguished in that the detector 16 controls also the channel selector 18. A black run length number when shifted out of register 17 is set in (bi-valued) 1 and O into channel 18B and concurrently o's are applied to channel 18W. This then establishes a number in ternary notation under utilization of characters B and O with a ternary B being defined as a binary 1 in 18B concurring with a O in channel 18W while a ternary O is represented by a "O" in both of the two channels 18B, 18W. Such a number is succeeded immediately by a number whose 1 and o bits (binary) are set into channel 18W with concurring 0's in each instance for channel 18B. Therefor, such white run length number is represented by ternary digits W and O, whereby, a ternary W is represented by a binary 1 in 18W and a O in 18B; a ternary O is again represented by two binary zeros in parallel in the two channels 18B, 18W.

A circuit 19 tracks the length of each number. This can be done in various ways. For example, following resetting of counter 15 the first change in state (from 0 to 1) of any stage in the counter during counting is counted as such. On resetting counter 15 that position counter has a count state indicating the number of bits to be shifted out of register 17 for a complete transfer of the number held therein. The position counter is counted down and when reaching zero, all bits have been passed into or through converter 18. Alternatively, one can connect an Or-gate to all stages in register 17 in parallel. In the present case device 19 is assumed to be such an Or-gate. As long as at least one 1 bit is in register 17 the number has not been completely transferred. Only when the Or-gate goes from true to false has shifting been completed.

The output of Or-gate 19 is used as gating signal in another clock gate 102 for the fast shift clock pulses, FC thus permitting passage of only as many pulses FC as are needed to empty shift register 17, following a transfer of a count number from counter 15. No clock pulse passes gate 102 until another run length number has been established in counter 15.

The gated fast clock pulses as needed to empty register 17, are also provided to the register assembly 20 via a line 21. They accompany the bits on channels 18B and 18W and clock them as to timing. Moreover, the number of clock pulses transmitted to line 21 indicates exactly the number of bits that are being transmitted in that instant.

It can readily be seen that the transmission of the ternary digits is an intermittent one and occurs in bursts of pulses; the pulses in each burst have rate and frequency of the fast clock. The spacing in between two such bursts is given by the time it takes counter 15 to meter the respective next run, which may be quite short or quite long. The next burst of signals in channels 18W, 18B and 21 occurs at the end of that run when the transition detector 16 causes transfer of the new run length number into shift register 17.

Run length numbers are, therefor, established and concatenated in immediate sequence, whereby the ternary notation distinguishes the types of runs metered in that fashion. By way of example, a run of white being twenty-one resolution elements long, followed by a run of black two elements long, followed by a run of white of three elements long followed by a run of black ten resolution elements long followed by a run of white fifty resolution elements long, will result in the following five run length number resulting in the ternary digit stream: WOWOWBOWWBOBOWWOOWO. Therefor, eighty-six distinct image elements are represented by nineteen ternary digits.

Data as provided by the encoder channels 18B and 18W are fed to register system 20. The register system participates in all of the system modes: encode-record; playback-transmit; receive-record; playback-decode. In each of these modes register unit 20 serves as buffer for the asynchronous operations it links.

The register unit has two sets or goups of registers, 22 and 23 respectively. During operation one set of registers receives data, for example as they have been encoded, or retrieved from tape or received from the modem while the respective other set of register feeds to the tape recorder, the modem (for transmission) or the decoder. When one set is full and the other is empty they exchange receiving and feeding functions. The sets alternate in these sub-modes until the respective data transfer through the register system has been completed.

The relationship of filling and emptying operations is such that the stream of ternary digits into the register system from the encoder into or from the modem, or out of the register into the modem or into the decoder, though irregular must not incur any delay or waiting period in the sense that the changeover from one register set to the other one must occur without delay, i.e. the respective other register set must always be ready, either holding data or be empty so that the data flow is not stopped. On the other hand, the tape recording and retrieval process can be and is being made a discontinuous one. Data are recorded and retrieved in blocks, each block having as many digits as each register set can hold. The tape unit records a data block as it empties one register set quite fast, stops and waits, so that the emptied register set is ready to receive data when the other set has been filled; the changeover will not interrupt that data flow. Analogously, the tape unit when retrieving will fill a register set quite fast and stop. The data are ready when the other set has been emptied and again the changeover will be quite fast and not interrupt that data flow. The tape speed can be selected to meet the rule that transfer of each data block to or from the tape unit is a faster operation than filling or emptying the respective other register set in each instance. The maximum rate of flow of ternary digits is 2.4khz. Even a simple tape unit can record and retrieve at a faster rate.

All data passing through register system 20 are represented in ternary notation, but they are electrically represented as bi-valued bits; they are, therefor, handled in two channels. Accordingly, the two sets of registers 22 and 23 respectively have two registers 22B, 22W (set 22) and two registers 23B, 23W (set 23), wherein corresponding positions hold the two bi-valued bits which establish a ternary digit.

The buffer register system 20 has two data input selector gates 24B and 24W respectively connected to the encoder output channels 18B and 18w for receiving data bits therefrom in the encode-record mode. Additionally, the modem 50 has two output channels 114B, 114W which serve as alternative inputs to selector gates 24B, 24W; a third pair of inputs is provided by the tape unit 5 on playback or reproduce of any stored ternary digits.

The selector gates 24B, 24W each have a single output and their function is to connect one of the three inputs to the output; in the encode-record mode that will be the channels 18B and 18W. In the playback or retrieve-transmit mode as well as in the playback-decode mode that will be the tape recorder output channels, and in the receive-record mode gates 24B, 24W receive data from the modem.

Analogously the register system has two data output selector gates 25B and 25W, with a single input each and three outputs, one leading to tape recorder 5, one to modem 50 and one to decoder 40. The output lines leading to modem 50 are denoted 62W, 62B and the output lines leading to demodulator 40 are denoted 41B and 41W.

The system has additionally four data path switches 26B, 26W, 27B and 27W. The switches 26B and 26W are input switches whereby switch 26B connects the output of input selector gate 24B either to the input of register 22B or to the input of register 23B. The analogous and synchronously operating gate 26W connects the output of input selector gate 24W either to the input of register 22W or to the input of register 23W.

Output switches 27B and 27W connect the outputs of the two registers of the respective other set to the inputs of output selector gates 25B and 25W. These gates could also be alternatingly blocked, but any empty register holds zeros only, and while it is being filled, the zeros appearing at its output side will be superceded by ones or zeros taken from the registers that are being emptied of true data. However, blocking the alternative input paths for gates 27 may be advisable for reasons of noise suppression.

It can readily be seen that by alternation of the enabling state of input and output data path switches 26B, 26W, 27B and 27W, data are filled into two of the four registers which establish one set while the respective other two registers establishing the second set are being emptied. Concurrent input and output switching reverse these functions.

Filling as well as emptying of the registers involve shifting processes of data in all instances, and shift clock pulses are provided externally from the respective units which provide and which receive the data. These clocks are quite irregular in cases representing irregular data flow, and it is one of the functions of this buffer system to accommodate such irregularity.

A system of clock switching gates 32 is provided and operated to feed input clock pulses as shift pulses either to registers 22B, 22W (set 22) or to registers 23B, 23W (set 23). The selection is made on the basis of whether set 22 or set 23 serves as input register set for receiving the respective data.

The input clock switching gate 32 receives the shift clock pulse as provided in bursts, by encoder 10 to line 21, during the video pick-up and encoding operation. In the alternative, gate 32 receives clock pulses from the tape unit via a line 35 and accompanying data when reproduced. Thirdly, clock pulses are furnished by the modem 50 via a line 115 during receiving of data from a remote transmitter.

The respective other set of registers, not being input clocked, receives output clock pulses through clock switching gate 33. This particular gate receives output clock pulses either from the tape unit 5 when recording (liner 34), or from the modem 50 via a line 61 when driving the transmitter or from the decoder 40 via a line 49 when controlling decoding and facsimile reproduction.

The selection for the appropriate clock path is made on the basis of which of sets 22 and 23 provides data in any instant and which of them receives data. Gates 32 and 33 are controlled so that one set of registers can receive data while the other one provides data. When the set providing data is empty and when the set receiving data is full the selection is changed.

The selection change is controlled on the basis of counting the numbers of clock pulses needed respectively to fill one set of registers and empty the other one. A counter 30 receives the input clock pulses that are being provided by gates 32 to the register system for purposes of input shifting regardless which set receives these pulses. Whenever the count state equivalent to capacity of either register set has been reached (they have the same capacity), the counter 30 responds and provides a signal to switch control 36. It may be assumed that the capacity is 512 bits, so that counter 30 tracks up to that number.

Analogously, a counter 31 receives the output clock pulses from gates 33, also regardless to which set of registers they are being applied, and upon having counted the full capacity (i.e. upon responding in effect to the fact that the output clock pulses have shifted all data out of one set of registers). Counter 31 responds also when having counted as many clock pulses as were needed to empty either register set (512) and provides a count-completed signal to switch and selection control 36.

Control 36 when receiving count completed signals from both counters, 30 and 31, provides a switching signal to gates 26B and 26W for switching the date-in flow paths. Output switching is not necessary if an emptied register is, in effect filled with replacement zeros so that 27B and 25W could be simple Or-gates. However for reason of improved noise suppression the input paths to 27B and 25W could also be alternatingly blocked.

The switch command from 36 is also applied to gates 32 and 33 for exchanging the flow of input and output clock pulses into the two register sets 22, 23. The changeover must be provided so that either encoder 10 or modem 50 can continue to furnish data (modes 1 and 3) or decoder 40 or modem 50 can continue to receive data without interruption. On the other hand the tape unit has always completed its task earlier, either retrieved a data block and stopped or recorded data and stopped. Thus, the switch signal from control 36 providing for the exchange of the register sets can also be used as command signal to tape unit 5 to start up again and to retrieve or to record the next block, and the tape unit will have completed this task before the respective other register set has received or provided all data it is capable of holding.

It will be recalled that during video scan and encoding operation selector 18 furnishes bursts of numbers defining the lengths of runs of white and the lengths of runs of black. As far as the system is concerned the two lines 18W, 18B furnishing W's as "ones" in line 18W concurring with a zero in line 18B, or characters B, as "ones" in line 18B concurring with a zero in line 18W, or ternary digit defined by two concurring zeros in both lines. The signals i.e. the signal level on the lines 18W, 18B are identified as bits by a concurring clock pulse in line 21.

Returning therefor to the description of the encode-record mode, line 21 as connected to input clock switching gates 32 provides the clock pulses as provided by circuit 102 during the encode-record mode, as input shift clock pulses to the register set selected for receiving data. The selector circuits 26B and 26W distribute the accompanying data from channels 18W and 18B in that for 512 clock pulses one set of registers receives these run length numbers in ternary rotation, and for the next 512 clock pulses the other set receives these data etc., without interruption of the data flow. The formation of these ternary run length numbers by encoder 10 continues and is not affected by the change in buffering.

Please note that these ternary digits as defining run length numbers come in irregular bursts, but a set may be full in the middle of such number, so that changeover from one set to the other one may become necessary inbetween two input clock pulses of the same burst. This is quite possible if in fact the respective other register set has been emptied in the meantime.

As one set of register is being filled, output clock pulses are received by circuit 33 from tape unit 5 via line 34 and are provided to the other set of registers so that the data are outputted through gates 27B and 27W and channeled particularly by gates 25B, 25W to the tape unit 5 for recording. Please note, that output path selection for gates 25B, 25W may have been made manually with linkage to the start up of the video pick-up.

The switching control signal as provided by circuit 36 is also applied to tape unit 5 which starts up and provides clock pulses from its own source to the line 34 at the rate of recording the ternary digits. These pulses are also applied to counter 31 and upon counting up to 512 a stop-record pulse is applied from counter 31 to the tape unit, which in turn will cease to furnish clock pulses. The tape unit now waits until the other set of registers has been filled from the encoder, counter 30 will respond to that condition and switch control 36 exchanges input/output as between the two sets of registers. The tape unit is started up again by the switch control command from circuit 36 so as to record the next data block.

The recording process and emptying of a set of registers is presumed to be carried out faster than filling a set of registers, so that the emptied set is ready with certainty for receiving ternary data when the other set has been filled. The switch command signal from circuit 36 clears both counters, however, the counters may be of the recycling variety (nine stages, binary) to be set to zero automatically when the highest count number has been reached.

The alternation between filling and emptying continues until the video pick-up ceases to furnish data whereupon the encoder ceases to furnish ternary digits and clock pulses. As no new numbers are shifted out of register 17 that operation ceases also. However, one could provide here for various termination procedures, such as providing enough additional clock pulses to fill the register set which receives data at that time so as to complete the block. At the end of transferring the last block to the tape unit, no new data are being loaded into the other set of registers. Thus, the tape unit 5 will receive a stop command from counter 31 but no new start command will issue.

Before describing the modem, some details of the decoder 40 and its operation should be described and perticularly here its cooperation with the register system 20. The decode operation begins when, following the transmission of data, ternary digits have been recorded in blocks of 512 digits on the tape, and the tape is played back for purposes of constructing a facsimile image.

The buffer cooperates with the tape unit as follows. Upon starting the tape unit 5 for playback, the unit furnishes clock pulses in a line 35 in synchronism with the reproduced data from the tape. The data are recorded e.g. in a self clocking format (NRZI, Manchester, frequency doubling ets.) so that the clock pulses accompanying each ternary digit as recorded are readily available.

The line 35 connects to the input clock gate 32, and the data bits as reproduced from tape are applied to input gates 24B, 24W and fed in blocks to one or the other register set in alternating sequence. Since counter 30 tracks the state of filling of any register set which receives data, counter 30 will issue now a stop command for the tape unit after a block of data has been reproduced.

The switch over from one set to the other is also carried out in response to a command for control unit 36, responding when the one set of registers is empty after the other set of registers has been filled. The changeover occurs here without interruption of the data flow into the decoder. The tape unit is halted when the last block of data has been retrieved, which may be an autonomous operation of the tape unit, responding e.g. to end-of-record markings or the like, which is conventional in digital data tape recording.

Data digits are clocked out of the respective registers in response to clock pulses received in bursts of fast clock pulses furnished by the decoder into a line 49. How these pulses are being developed will be shown shortly. Whevever ternary data digits are outputted in that manner from one or the other set of registers (the decoder does not "see" from which set they issue nor when a changeover occurs), data digits are applied to the two decoder input lines 41W and 41B respectively being selected output lines from gates 25W, 25B in the reproduce-decode mode.

Broadly speaking, run length numbers are shifted into a register 45 and transferred into a counter 46. The counter content is counted down at a rate commensurate with the stepwise reconstituting of the actual run length. These reconstituted source and run length signals will be the input for print control 2.

Turning now to details, the ternary data as sequentially drawn from the registers are at first applied to a combining gate 42 which simply interprets every B and every W as a "one," and two concurring zeros in channels 41B, 41W become a single zero. This merger of two bit streams obliterates the black/white distinction and reconstitutes mere binary run length numbers. However, the bit-streams in channel 41B are, for example, fed additionally to the set side of a flip-flop or latch in a transition detector 43, while the bit-streams in channel 41W are fed to the reset side of such a latch. The latch, therefor changes state for each first (of a few or the only) B, and again for each first (of a few or the only) W. The state of the flip-flop in transition detector 43 therefor, indicates whether the bits merged in gate 42 define a number indicating the length of a run of black or the length of a run of white.

Since change from black to white or vice versa is indicated by the first or highest significant bit of the respective number, that bit, always a "one," is held in a one stage buffer 44, because a detected change in state by transition detector 43 stops the development of shift clock pulse for the shift register 45; stage 44 is an input stage or buffer for that register.

A complete run length number, black or white is serially shifted into the shift register 45 (all bits having passed through buffer 44) and held therein when the detector 43 determines that the most significant bit of the number defining the next run length of opposite contrast has been set into buffer 44.

The latch or flip-flop included in transition detector 43 may operate a single-shot which is triggered on each change of state of that detector latch flip-flop regardless of direction, and the pulse so produced is set into a line 43a to be used as parallel clocking pulse and to control copying of the number held in register 45 into counter 46. The same signal effecting the transfer, but with a slight delay, is used also to clear register 45.

Counter 46 receives continuously a train of slow clock pulses. These clock pulses may be the same 2.4khz pulses as used for and in the encoder 10, but there is no inherent necessity for that similarity. The slow clock may actually be furnished by the print control device 2 across interface 3. This clock is used for counting down any number set into counter 46 and defines, in the essence, the resolution and speed of the facsimile reproduce process.

The print control device 2 receives the latch or flip-flop signal from detector 43 as the reconstituted source signal; a change to the set state by a digit B indicates that the number just set into register 45 and transferred to counter 46 on the reset-to-set changeover in circuit 43 indicates a run of white. Hence, the set state signal as applied by circuit 43 across the interface 3 to print control 2 informs the print control not to print black markings.

That "white" signal will persist as long as it takes to count down that white run length number in counter 46; the slow clock performs the counting down and meters a length of no-black-print commands in that fashion.

A "zero" detector 47 responds to absence of any "ones" in counter 46 and sets a flip-flop in a gating assembly 48 to which are applied fast clock pulses, and these fast clock pulses are applied to the line 49 as long as the flip-flop in 48 is set. It will be recalled that 49 is the output clock line of decoder 40 leading to the register assembly 20 to apply such clock pulses to the input clock gate 32 during the reproduce-decode mode.

The clock pulses FC which are permitted to pass the duration-controlled gate assembly 48 are also applied to buffer 44 and to shift register 45. Buffer 45 is actually the first stage of register 45 but distinguishes from the remaining stages in that no parallel path to counter 46 is provided.

Following count down of counter 46, response of zero detector 47 furnished a go command to duration controlled clock gating circuit 48, and fast clock pulses are set into line 49. They are applied to the output clock gates 33, and new ternary data digits will arrive in channels 41B, 41W and shifted into register 44/45.

It may be assumed by way of example that the previous number (which was just counted down in 46) was composed of digits W and O, while a first bit B was held in buffer 44. Now, the remainder of that black run length number is clocked out of the register set that is being emptied with additional digits B and/or O pertaining to that number, appearing in line 41B and being shifted through stage 44 into register 45 until the most significant digit of the next white run length appears, which must be a digit W, and a digit W is set into stage 44 as a 1 while transition detector 43 responds. That response is now used also as stop command for the clock gating circuit 48 in that it resets the flip-flop therein thus terminating the particular burst of clock pulses which caused the remainder of this black run length number and the first digit of the immediately following white run length number to be fed by the register set into channels 41B, 41W.

The response of detector 43 to the first digit W of the next white run length number is, therefore, used fourfold. First, the changed state of the black/white discriminating latch or flip-flop in circuit 43 signals to the print controller 2 that a run of black begins. Secondly, the new black number is transferred to counter 46 for counting down and metering the length of the black run, until this run length number has been reduced to zero. Thirdly, the content of register 45 is cleared with a slight delay so that the transfer to counter 46 is in fact completed before clearing. Forthly, the flip-flop in the duration controlled gate 48 is reset for blocking passage of additional fast clock pulses so that output shifting in the register set of system 20 that is being emptied ceases, and the shifting in register 45 ceases also.

One can readily see that alternating runs of black and white are controlled in this manner of intermittent transfer of run length numbers and counting them down, while decoding the ternary digits B and W is used to distinguish between black and white. The clock pulses FC affecting the transfer of any number from the register unit 20 to decoder 40 is sufficiently fast to be completed inbetween two slow clock pulses; the situation is analogous to the conditions of stepwise encoding as outlined above.

The principle purpose of converting run length numbers derived from digitized video signals into ternary coded signals is of course to have an immediate representation as to whether such a number represents the length of a run of black or of a run of white without requiring additional identification. The ternary encoding is handled in the encoder 10, in the tape unit 5 as well as in the decoder 40 on a two channel basis with B and W distinction being made by channel selection. The transmission of facsimile data however must be carried out through a single channel. The purpose of the modem 50 is to combine the two channels in a manner which does not only maintain the ternary code as such; but permits further compacting of the information as it is going to be transmitted.

The alphabet of symbols to be generated by the modem and transmitted, includes six symbols for the following two digit combinations WB; BW; BO; WO; WW; BB and a seventh symbol for a single O. The first four symbols represent all possible boundaries between two different run length numbers, whereby however the combinations WO and BO could occur and will be used within run length numbers. Moreover, not all boundaries are represented in that manner, as for example the two concatenated symbols WBWB represent three boundaries. The symbols have been chosen on the basis of most frequent use of combinations and to limit the alphabet to seven symbols.

Several pages earlier we had assumed by way of example that a contrast pattern resulted in a ternary digit stream W O W O W B O W W B O B O W W O O W O. The vertical lines denote which two or one digits are identified by a symbol. One can, therefor, see that the eighty-six image elements, represented by 19 ternary digits are represented by eleven symbols. Out of these eleven symbols, eight represent two digits, the one digit symbol is used only three times.

After these preliminary remarks, I proceed to the description of the modulation section of modem 50 in FIG. 4. The alphabet of modulation symbols requires distinction between seven symbols, six symbols are represented by one and one-half wavelengths of a carrier frequency at a particular distinctive phase, one symbol being represented by a zero amplitude level signal, also for one and one-half wavelengths duration of that carrier. The carrier freq. is 1.8 kilohertz, the symbol periods follow, therefor, at a 1.2 khz rate.

The carrier frequency is provided by an oscillator 51 providing its signals to a network 52 which has three outputs. The center output has the signal itself and is regarded as O-phase. The upper output is the +60° phase shifted carrier and the lower output is the −60° phase shifted carrier. This then are three phases which are individually amplified and fed respectively through three analog gates 53 (called 53+60, 53−0, 53−60) and summed at point 54. The three phases are never applied concurrently to summing point 54, but only one gate of 53 at a time (or none) is selected.

An operational amplifier 55 is connected to point 54 to provide the input signal directly at its output, or the inversion of the input signal is provided when a gate 56 grounds the non-inverting input of the amplifier 55. By virtue of this selective inversion one can provide the 180° phase shifted signal for each of the three phases generated by network 52. Looking briefly at FIG. 2 one can see that the three phases, 0, 1 and 5 are provided directly. Upon inversion of these phases, phases 3, 4 and 2 respectively are provided. Phase 6 requires all gates 53 to be off, the state of gate 56 may remain as is.

An operational amplifier 57 provides the data modulated carrier to the transmitter 6. Amplifier 57 has a summing input and does not only transmit the data symbol modulated carrier but also two pilot tones, generated by appropriate oscillators (or counted down from a common oscillator from which all needed frequencies are derived). The pilot tones have 3 kilohertz and 600 hertz frequency respectively, just outside of the carrier band which extends from about 800 hertz to 2800 hertz. Thus, the pilot tones permit separate recovery.

These pilot tones and their effect will be described more fully pursuant to demodulation; suffice it to say presently that the pilot tones are being added to the data signals and transmitted concurrently with as well as prior to and, possible, subsequently to data transmission proper.

It should be repeated that a data transmission sequence begins with preparatory steps. Circuit 105 provides for this initialization e.g. on a basis of semiautonomous internal timing. At first the pilot tones (3 khz and 0.6 khz) are transmitted together with phase zero. For this, gates 56 and gate 53−0 are turned on and the pilot tones together with the unmodulated carrier frequency are transmitted. This transmission is to last for a certain minimum period of time which is given by 256/1800 or about 1/7 of a second.

This transmission is followed by the transmission of the pilot tones and of alternating phases 1 and 5. In other words the carrier is phase modulated by +60° and −60° in alternating sequence and at the symbol rate of 1.2 khz. Control block 105 denotes this operation schematically, simply enabling analog gates 53°−60° and 53°+60° alternatingly in symbol rate synchronism.

The transmission of pilot tones plus phases No. 1 and 5 is followed by continued pilot tones transmission plus again zero phase for the same or about the same period as before. Upon cessation of zero phase the flow of data starts, because data will never start with the zero symbol.

The modulation of the carrier with data in the general sense is carried out in the following manner. It will be recalled that in the playback-transmit mode tape unit 5 provides blocks of ternary data to the register system 20 and sets them alternatingly into the two sets at the playback clock rate signalled through line 35 (FIG. 3). This playback operation and input clocking of the registers 20 is the same as already described with reference to the playback-decode mode. However, presently the output clocking is carried out by the modem 50. The output clock is provided by the modem in line 61 leading from the ternary-to-seven-symbol converter 60 to the output clock gates 33 in register system 20.

The ternary data are provided first from one, later from the other register set with subsequent alternation between them. These data are fed by gates 25B, 25W to data lines 62B and 62W, digit by digit at the clock rate. The clock pulses used here are furnished by a high frequency oscillator equivalent to or the same as the fast clock FC used elsewhere in the system and mentioned repeatedly above. These clock pulses are provided to line 61 in bursts of one or two pulses per burst, but with a regular burst rate of 1.2 kilohertz.

A circuit 63 responds to a selector signal in a line 66 indicating whether the next burst is to have one or two closely spaced, high frequency or fast clock pulses. The circuit 63 is shown in some detail in FIG. 4a and includes e.g. a two-counter, triggered e.g. at one type of zero crossing of the 1.2khz signal wave and counting fast clock pulses FC thereafter and controlling a gate included in circuit 63 which permits passage of these pulses as long as the counter has not reached count state 2. The selector signal presets the counter to count state 1 or count state 0 so that indeed bursts of one or two fast clock pulses are metered, following the beginning of each 1.2khz wave period as measured from the zero crossing that enables the counter.

The data digits are thus clocked out of the register unit 20 at clock pulse bursts as applied to line 61. The bursts follow each other at symbol rate. Either one ternary digit or two ternary digits in sequence appear in lines 62B, 62W for each symbol frame and are set into a 2-state-2 bit shifting buffer 64 receiving the same clock pulse burst for that purpose.

The bit combination held in the four stages of buffer 64 after each clock pulse burst represent in each instance the combination of two sequential ternary digits. The stages of the buffer are denoted 64-1B, 64-2B, 64-1W, 64-2W. A combination of stages 64-1B = 1, 64-1W = 0, 64-2B = 0, 64-2W = 0, represent a ternary B followed by a ternary zero. A combination of states 64-1B = 0. 64-1W = 1; 64-2B = 1; 64-2W = 0 represent a ternary W followed by a ternary B. Each of these two examples represent a combination of two ternary digits which are to be represented by *a* single symbol.

The circuit 65 is coupled to the outputs of the four stages of buffer 64 and responds to six out of the nine possible two-ternary digit combinations which can be held in the buffer 64. The circuit 65 has seven outputs. As to six of these outputs the circuit provides a two-digit (or four state)-to-one-out-of-six conversion. The lines have been designated for convenience by the notation used for describing the seven symbols in ternary digit combinations i.e. WW, BB, BO, WO, WB, BW, and O. The first six lines go up individually when the two ternary digits held in the two stage buffer 64 represent respectively the ternary groups W,W; B, B; B,O; W,O; W,B; W,B.

In the first one of the two representative examples for assumed states of the stage in buffer 64 the line Bo will go up, the others will stay down. In the second example the line WB will go up and the others will stay down. This way the six different combinations of digit groups are converted into a one out of six code, each representing electrically *a* symbol.

In each of these six situations (which does not encompass all possible combinations of digits W, B and O, there are nine of them) the select line 66 receives a signal (which may be the Or'd output of these six lines for the two bit symbols) for signalled to selector circuit 63 that the next clock pulse burst should encompass two fast clock pulses. This will clear the two stage buffer register 64 completely in that two new ternary bits are set into buffer 64.

The seventh situation occurs when the first stage, i.e. flip-flops 64-1B and 64-1W each hold a 0. That represents a ternary zero and no two-ternary group has a zero as a first digit. This ternary zero is, therefor, decoded individually, and the seventh line of circuit 65 denoted 0 goes up, the other six stay down and line 66 signals that only a single clock pulse burst is to be produced. Accordingly the ternary digit held in stages 64-2B, 64-2W is shifted to stages 64-1B, 64-1W and another ternary digit is set into stages 64-1B, 64-1W. This may lead to a two digit-to-symbol or to a one digit-to-symbol conversion depending on the value of the ternary digit which was transferred from 64-2 to 64-1.

It can thus be seen that the subsystem 60 clocks the ternary digits out of the register 20 in groups of one or two digits depending on the preceding conversion in circuit 65 to a two-digit-to-one-out-of-six code or into the seventh one digit-for-one symbol conversion. The seven output lines hold a signal, one at a time and for the duration of the symbol rate period (the duration difference as to one or two fast clock bursts is insignificant); the symbol rate being 1.2khz, while the fast clock may approach the megahertz range.

The circuit 65 can be realized by six "and" gates with four inputs each and appropriate connections to the four flip-flops of buffer 64; the seventh output is provided by an "and" gate with two inputs connected to the false outputs of two flip-flops 64-1B, 64-1W. The signal in line 66 can be provided by Or-ing the outputs of the six, four-input-"and" gates.

The seven output lines from circuit 65 lead to a switching circuit 67 providing switching signals to effect the modulation proper. Three lines lead respectively to one each of the three analog gates 53 to enable one of them so that one of the three different phases 0°, +60° or −60° be applied to summing point 54 for a duration of one symbol period (1/1200) which is equal to one and one-half wave-length of the carrier frequency. The fourth output of switching circuit 67 either enables or disables gate 56 to determine whether one of the phase 0°, +60°, −60° or 180°, −120° or +120° is to be selected. This then covers modulation by six symbols. The seventh situation of modulation is produced by leaving all gates off so that zero signal level is established on the outputs of amplifiers 55 and 57.

It should be emphasized that there is no constraint as to assignment of symbols to any of the six phases plus off representations for such symbols. The choice is an arbitrary one. However for reasons below it is practical to assign the symbol 0 (as representing a single ternary digit 0 not following a single digit B or W) to the zero phase. Since the data transmitted are symbols representing portions of run length numbers, a string of 0-symbols is definitely not such a number and can, therefor, readily be used for purposes of synchronization.

As was outlined above the transmission of data is preceded by transmitting phase 0, phases 1 and 5 alternatingly, followed again by phase 0, and the termination of the second phase 0 transmission can be used as an alternative input for clock control circuit 63 issuing the first two clock pulses so as to call for the first two ternary digits from the register unit 20. As far as the modem is concerned, this involves merely disabling of gate 53-0 and control is now turned over to subsystem 60 as it will call on the bits in register unit 20 for stepwise conversion into symbols.

The first symbol will not be the zero symbol but any of the others which begin with a W or a B. The data transmission continues thereafter in continuous sequence until all data i.e. all run length numbers in ternary code have been converted into a continuous stream of symbols and transmitted in a seven level phase modulation of the 1.8khz carrier. The closing and disconnect procedure is an arbitrary one and not significant for the inventive method and system as such. When the tape (from which the ternary data were reproduced) has been emptied, an end-of-record signal may issue and disable the modem.

The modem will also operate in the receive submode for the receive-record mode of the system. Intial hook up and turn on operation need not to be described because conventional procedure may be followed here. Also, analog signal processes concerning equalization may follow conventional lines. However, the following details will be described with reference to FIG. 5 for reasons of relevancy.

(1) The demodulation part of the modem must recover the symbol rate; (2) the modem must recover the carrier rate and here particularly zero phase of the carrier; (3) the modem must establish precise points in time for sampling of data in synchronism with the symbol rate; (4) the modem must phase-demodulate the information as presented by the stream of phase modulated carrier signals, including recovery of the zero level signals.

For purposes of demodulation, the receiver 7 provides the signals it receives to an impedance matching network 71 for interfacing the modem with the receiver. The signal is agc controlled at 72 because only phase modulation is of interest whereby, however, noise rejection is provided to define a zero level for recognizing the seventh symbol. Two narrow band pass filters 73 and 74 respectively separate the 600 Hz and 3 khz pilot tones when transmitted, and phase locked loops 75 and 76 reconstitute the pilot tones.

A mixer 77 establishes the two frequencies of 3600 Hz and 2400 Hz of which the former is rejected and only the latter is permitted to pass a filter plus phase locked loop 78. Since it is a difference signal, any constant phase and frequency shifts resulting from transmission distortion is eliminated from the difference signal. A divide-by-two network 79 provides, therefor, a 1.2 khz signal which is the character rate frequency free from any line distortions. Thus, the character rate frequency is faithfully reproduced in the receiving modem.

The outputs of phase locked loop 76 and of divider 79 are combined in a mixer 81 to establish a 1.8 khz signal which, however, includes the line distortions as to frequency shifts resulting from the transmission. The mixer 81 is the input element for the carrier recovery circuit. Since the carrier frequency signal itself will undergo the same frequency shift, the carrier as synthesized from the pilot tones will track the carrier proper, as to any frequency shift so that this synthesized signal as derived from mixer 81 can serve as local carrier reference. However the phase of that reference is undetermined in relation to the carrier as transmitted during data transmission.

For purposes of recovering the exact phase of the carrier, this output signal of mixer 81 is fed to a phase lock loop and divide-by-256 (or $2^8$) circuit 82 which establishes a train of $1.8 \cdot 256$ khz clock pulses to be fed to a counter 83 which recycles after counting 256 pulses. The state of the highest significant count stage in counter 83 is, therefor, a square wave signal having 1.8 khz frequency (plus or minus any line distortion). If one assumes that counter 83 is started at a time of a down swing zero crossing of the oscillatory signal from mixer 81, then the oscillation of on-off states of the highest (eighth) stage in counter 83 is in precise synchronism with that input. That signal is set into a line 84 which feeds a phase circuit 52'.

Circuit 52' is actually identical with circuit 52 and is used by the demodulator part on a time and function sharing basis. The output of circuit 52' is, therefor, furnished in three lines respectively providing for the +60° −60° and zero shifted signal of its input.

To recapitulate, prior to data transmission a transmitter transmits the pilot tones of 3000 Hz and 600 Hz together with the zero phase signal (straight forward carrier). The modem on the receiver end responds to the two pilot tones and derives therefrom (mixer 81) a 1.8khz reference signal. Carrier or zero phase signal as received has indefinite phase relation to the reference signal as derived from the two pilot tones. The circuit to be described next establishes a definite phase relation between these two signals.

Reference numeral 80 refers to three phase detectors, 80+60, 80—0, 80—60, used by the modem consistently for demodulation, in the data symbol demodulation phases as well as in the initialization phases. The three detectors are individually identified by the specific phase angle relative to the input of network 52' to which they are attuned. Therefor, the three phase detectors are identified by suffix numbers +60, 0 and −60.

Each phase detector receives the same signal as received by the respective receiver 7 as processed in 71 and 72 and after having passed through a band pass filter 84 so that only the symbol-modulated carrier band is fed to these detectors. Band pass filtering may not be necessary if the detectors have enough capability of rejecting the pilot tones and other noise which are at a significantly lower db level.

Each phase detector compares, therefor, the phase of the symbol modulated carrier with one of the three different outputs of network 52'. The input of 52' is the 1.8khz wave as generated by counter 83 and constitutes the controlled reference signal for demodulation. If the zero phase signal as transmitted and received happens to have the same phase as the reference signal, then detector 80—0 provides a full scale output, arbitrarily denoted as 1, while detectors 80+60 and 80—60 each provide an output of 0.5 (because the absolute value of cosine of ±60° is 0.5). Hence, when the reference signal is in phase with the zero phase signal as received, detectors 80+60 and 80—60 provide equal outputs. When reference and received zero phase signals are out of phase these two detectors provide different outputs.

The objective of this first initialization procedure is to establish the phase of the reference to equal the carrier phase (identical with the zero phase signal) as transmitted. Therefor, the outputs of detectors 80+60 and 80—60 are fed to two inputs of a differential amplifier 85 which provides zero output (within a very small tolerance range) when the inputs are equal. Amplifier 85 provides plus or minus saturation outputs when the inputs differ in one sense or the other. The sign of the output of amplifier 85 indicates, therefor, whether the reference lags or leads.

A set of gates 86 responds to the output of amplifier 85 and provides preset or reset signals to counter 83 e.g. by adding count pulses or by suppressing count pulses as derived from multiplier 82. As a consequence, the phase of the output signal of counter 83 is shifted, and shifting in one direction or the other will persist until the outputs of detectors 80—60 and 80+60 are equal.

Please note that these two detector outputs would also be equal for a 180° out-of-phase relation between zero phase input and reference signals. This, however presents an unstable situation as far as the feed back loop is concerned and cannot be maintained, because any deviation will cause the difference to increase rather than decrease. In reality then such a situation will occur only transitorily.

At the end of this procedure, the phase of the controlled reference signal as furnished by counter 83 is equal to the zero phase signal. It must be born in mind that this reference signal is derived from the pilot tones, and the counter 83 recycling frequency has now a different but constant phase to the signal synthesized in mixer 81. On the other hand, any frequency shift in the pilot signals as it will also effect the data band signals as transmitted will effect the reference signal in the same manner, so that the reference signal will track the data signals.

It will be recalled that in the initialization phase transmission of the zero phase signal is followed by a control signal train wherein the pilot tones are accompanied by alternating sequence of phases one and five. It is irrelevant at this point what data symbols are represented by these phases as these signals do not represent data proper but control information. Decisive is that the carrier as transmitted is modulated at symbol rate by providing the carrier with an alternating +60° and −60° phase shift for a duration of one and one-half wavelength in each instance. This control information is used to synchronize the demodulation process with the transmission.

The first aspect of this process has already been described, namely the extraction of the symbol rate frequency as such, provided by divider 79 accordingly. This frequency is, therefor, also extracted from the pilot tones, but is invariant as such, because mixer 77 eliminated changes in the pilot tone frequencies. Analogously, any frequency shift in the carrier band as transmitted does not shift the symbol frame rate. That rate stays precisely at 1.8 khz as transmitted. The circuit to be described next establishes a precise phase for detection of the transmitted symbol frames, and more particularly for establishing sampling points in time in which to sample the phase detectors when responding to the various phase modulations.

A phase lock loop and frequency multiplier (x256) 87 reponds to the 1.2 khz output signal from divider 79 and provides counting pulses to a counter 88 recycling after 256 and, therefor, operating as frequency divider. The eighths stage of counter 88 oscillates at 1.2 khz, but presetting or resetting of the counter permits adjustment of the phase as between the signal that is being multiplied and the counter output. The sampling signal for demodulation is extracted from counter 88, so that the phase of the sampling period is being placed precisely within each symbol period or frame, actually as close to the end as practical. Therefor, it is necessary that the 1–5 phase modulation in this initialization stage is in precise synchronism and phase coherent with the symbol frame sequence used when true data is transmitted subsequently.

During this period of initially establishing the sampling point, the transmitter sends alternatingly phases 1 and 5. This control information signal is applied to the three phase detectors 80 and detectors 80−60 and 80+60 produce alternatingly full scale output. These outputs are alternatingly applied to a capacitor 89 which accordingly charges and reverses charge by operation of applying alternatingly the output voltages of detectors 80−60 and 80+60 to the electrodes of capacitor 89.

Figure 7:
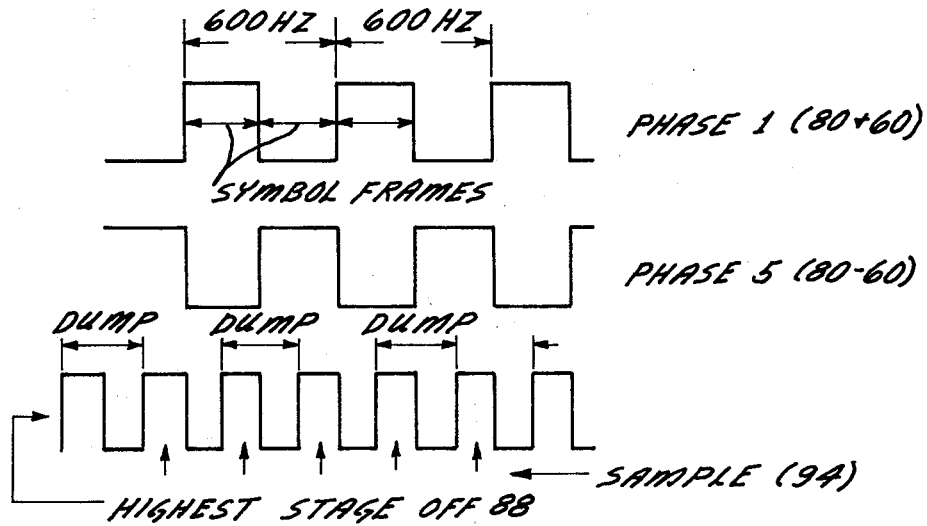
FIG. 7 are timing diagrams for explaining frame phase recovery.

The charge operation, however, is not permitted to continue undisturbed. Rather, a switch such as a FET 91 is connected across the capacitor and controlled to dump the charge in regular sequence. The control signal as applied to the FET 91 is derived from counter 88 after a division-by-two in a circuit 92 so that the control voltage has 600 cps frequency. Therefor a turn on voltage for FET 91 persists for a full 1/1200 symbol period followed by a period of like duration in which the FET is held non-conductive followed by a period of conduction etc. Thus, capacitor 89 is permitted to charge and reverse charge only for every other symbol period, and inbetween the capacitor is held to a no charge level (see FIG. 7).

It follows from the foregoing, that the average charge state during periods in which the capacitor can charge depends on the phase of the off periods in relation to periods of phase detection by the detectors 80−60 and 80+60. If we assume that the periods in which the capacitor can charge coincide with the periods in which the transmitted signal is the fifths phase, detector 80−60 will respond always when the capacitor can charge, while the response of detector 80+60 will coincide with periods when the capacitor is short circuited. Hence, a voltage of particular polarity is established always across the capacitor 89 in intermittent sequence.

Analogously, if the periods of non-conduction of FET 91 coincide with the periods of response of detector 80+60, the voltage established across the capacitor, on the average, has the opposite polarity.

A differential amplifier 90 with integrating input but having a short time constant has its two inputs connected across the capacitor and is in one or the opposite state in these situations as just described. The amplifier thus responds to the average voltage on the capacitor. The amplifier 90 operates a preset-reset selector 93 to advance or to retard counter 88 so that its output is shifted in time. The output of divider 92 is shifted accordingly and in a direction tending to minimize the average charge build up across capacitor 91.

The stable state is established when the off periods of FET 91 coincide in each instance with half the period in which detector 80−60 is on and with half of the following period in which detector 80+60 is on (or vice versa which makes do difference). (See FIG. 7) One can also say, that the instants of FET turn on, as well as the instants of FET turn off will coincide with the centers of sequential symbols periods as transmitted.

When the period of FET turn off is shifted in time into that position, capacitor 91 charges in one direction and reverses charge after half the off period of the FET so that the average charge voltage during off periods of the FET is also zero. The amplifier 90 will cease to change the counter 88 and the phase of the 1.2 khz output signal of the highest stage in counter 88 has in fact been synchronized with the symbol periods in that a full wave coincides exactly with one frame or symbol period from zero crossing to zero crossing except that such a wave begins with a negative swing corresponding to the reset state of that highest counter stage.

A circuit 94 provides for a delay from the beginning of each recycling period of counter 88 (up swing of its highest stage), for almost but not quite half the value of that period so that the resulting sampling pulse falls close to the end of each symbol period as transmitted. Or, to state it differently, the sampling pulses so produced come close to the end of response of any of the phase detectors. In reality the sampling pulse could be derived from counter 88 as *a* particular, rather high count number, close to counter recycling, through proper count state detection and gating.

The adjusted phase of the sample pulse is maintained and is independent from any line frequence shift, because the symbol rate was derived from the pilot tones in a manner eliminating frequency shifts and because the symbol rate phase as such is not subjected to any frequency change produced by the transmission lines.

In order to separate the initialization phases from transmission of data proper, the zero phase is transmitted again. The reference signal as applied to network 52′ could be re-synchronized again, but that is not necessary. Nevertheless, sampling may commence during that phase to have a gapless transition to the transmission of true data symbols.

As state above, sampling pulses of short duration and phased to almost coincide with the end of each symbol period are furnished by circuit 94 now in continuous sequence. These sampling pulses are applied as gating signals to three sample-and-hold comparators 95 each having two inputs. One input of each comparator is grounded and the others connect respectively to the outputs of detectors 80. A logic network 96 decodes the sampled outputs of the three comparators.

Each comparator is in one state when the output of the respective phase detector to which it is connected is positive (regardless of amplitude), while reversing state when the output of the respective phase detector is negative. Phase detector 80—0, for example, provides for a positive output for symbols represented by phases 5, 0 and 1 while this phase detector provides a negative output for phases 2, 3 and 4. Analogous considerations can be made for the other phase detectors, so that the following truth table can be established:

| phase | detectors 80 +60° | 0 | −60° |
|---|---|---|---|
| 0 | + | + | + |
| 1 | + | + | − |
| 2 | + | − | − |
| 3 | − | − | − |
| 4 | − | − | + |
| 5 | − | + | + |

Translating (+) and (−) into 1 and 0 as represented by output states of the comparators, one can see that logic gating of the tree comparator outputs permits definite assignment between comparator responses and detected phase modulation.

One can readily see that a considerable range for phase errors can be accommodated. Actually an error of ±30° of each phase modulation is permitted, and such modulation will still be recognized, while on the other hand one does not need an unduly high threshold for each of the comparators. If one would provide only a one comparator-for-one phase detection, the response threshold of that comparator would have to be well in excess of 0.5 full scale output which does not permit much tolerance in the detection of the several phases.

To state it differently, the phase diagram as shown in FIG. 2 can be divided by detection planes, represented by dashed lines in the diagram. Three of the comparators must furnish one polarity output on one side of any plane for detection of one particular phase. This rule permits detection in spite of any phase error by ±30°, equivalent to a phase detector output of at least 0.5 full scale value for at least one phase detector.

The seventh symbol is detected by a set of six comparators 97 connected in pairs to the three detectors 80 with a reference set for 0.5 of three of them and −0.5 for the other three, one of each type together forming a pair that is connected to the same phase detector.

The response is such, that all six comparators 97 must receive inputs below the respective 0.5 threshold, + or − as the case may be. The respective comparator outputs are treated as true signals and are fed to an "and" gate 98 the response of which represents detection of the seventh symbol. In other words, the six comparators 97 determine whether the output of each comparator is close to zero signal level. The sample signal may serve as additional input, and the output of the "and" gate 98 may be constructed for sample-and-hold operation with erasure of the output on the next sample pulse when no complete coincidence exists.

The output of gate 98 is therefor passed through network 96 to serve as demodulated output on the seventh output line from network 96. Additionally, a signal in that line from gate 98 serves as override, because the three comparators 95 are likely to signal the third phase. Thus, detection of the third phase is predicted on absence of response of gate 98.

Demodulation is succeeded for each symbol by conversion into ternary code. A circuit 100 provides for the reverse conversion as provided by circuit 65. The conversion from the outputs of the phase detectors generally, and of comparators 95 in particular does not have to lead to a separate identification for each of the seven symbols and further conversion into the ternary code. Rather, the logical outputs of the three comparators can be set into a like number of latches from which ternary digits (bi-valued digits in two parallel channels) can be clocked, whereby the particular response of the decoder to the zero symbol provides for a burst of one clock pulse, absence of such response permits two clock pulses per decoded symbol. It is however, more illustrative to explain the conversion process in steps.

Accordingly, circuit 96 can be deemed to provide a gated one-out-of seven code signal in realization of the truth table above. A ciruit 111 converts six of the one-out-of seven code signals into four bi-valued digits equivalent to two ternary digits. Additionally, the seventh demodulation output as derived from circuit 96 causes circuit 111 to provide two bi-valued digits in representation of a single ternary digit of value zero.

The signals as provided by circuit 111 are set into the four stages of a two-ternary-digit stage register 112, quite equivalent to register 64. Whenever the output line of gate 98 for the next symbol decoded is false, the next symbol is a two-ternary-digit symbol, and clock gating circuit 113 produces two fast shift clocks for shifting the bits out of register 112 into output lines 114B and 114W, before loading the register anew. The same two clock pulses appear in clock line 115 for use in the register system 20. If the output line from gate 98 on the next demodulation step indicates that the next symbol represents the single ternary zero digit, just one shift clock is produced and two (binary) 0 bits are set into the first two stages of register 112.

The output lines 114W, 114B of register 112 are connected to the two input gates 24B, 24W of FIG. 3, while the clock line 115 is the third input clock line for selector clock gates 32 (FIG. 3). The demodulated and to-ternary converted signals are, therefor, stored again on tape and in blocks, and upon completion of transmission the tape is played back for controlled reconstruction of a facsimile image as was described earlier with respect to the description of the playback-reproduce mode.

The invention is not limited to the embodiments described above but all changes and modifications thereof not constituting departures from the spirit and scope of the invention are intended to be included.

I claim:

1. In a facsimile unit which includes a video pick-up to provide a train of video signals and a reproduction unit operating in response to a train of control signals to obtain a facsimile reproduction, further having a transmitter for transmitting modulated carrier signals and a receiver for receiving such signals, comprising:

first means for converting the video signals into a sequence of run length numbers represented by a train of ternary digits;

a buffer system for storing portions of the train of ternary digits;

a record/reproduce unit for calling on the buffer system and recording the ternary digits, the ternary digits passing again through the buffer system on reproduction;

a modem having a modulation unit to provide for modulation of a carrier by means of symbols in groups of one and two ternary digits and at a particular symbol rate, the modem connected to the transmitter to obtain the transmission of these phase modulated signals; and the modem having a demodulation unit to demodulate the signals as received by the receiver and converting them into a stream of ternary digits, the digits being stored in the buffer system and the tape unit until reproduction by the facsimile reproduction unit.

2. In the unit as in claim 1, wherein the buffer has two register means alternately connected to the first means for being filled with the said ternary digits, the respective other register means being connected to the record/reproduce unit for feeding its content thereto.

3. In a unit as in claim 2, wherein the record/reproduce unit operates with a storage surface and records the ternary digits in blocks corresponding to the capacity of each said register means.

4. In a unit as in claim 2 and including:

first circuit means for connecting the buffer to the encoder and to the storage unit for buffering a flow data from the encoder to the storage unit;

second circuit means connecting the buffer to the storage unit and to the modem for buffering a flow of data from the storage unit to the modem or vice versa; and third circuit means connecting the buffer to the storage unit and to the decoder for buffering a data flow from the storage unit to the decoder.

5. In the unit as in claim 1, the first means including a counting means for counting the length of alternatingly presented runs of white and runs of black of the video signal;

circuit means connected to set the count numbers as counted by the counting means alternatingly into a first and second channel, so that the first channel receives the count numbers representing the lengths of the runs of black, and the second channel receives count numbers representing the lenghs of the runs of white, whereby count numbers in one channel are accompanied by zeros in the respective other channel; and the buffer system and the recording unit operating in two channels, separately but in parallel to obtain recording of the bits in parallel tracks, each bit pair in said channels constituting a ternary digit.

6. The unit as in claim 5, wherein the buffer means includes a first pair of registers and a second pair of registers alternately receiving said count numbers in said two channels and in bursts equal to the length of each such count number, the record/reproduce unit connected to receive the count number bits from the respective other pair of registers which has been filled previously, and to record the bits in the parallel tracks.

7. A system as in claim 1, said symbols being six different phase modulations plus off of said carrier.

8. In a unit as in claim 7, the modem having three phase detectors for receiving phase modulated carrier signals;

first circuit means connected to the phase detectors for determining the polarity of the output of each of said phase detectors; and second circuit means connected to the first circuit means for obtaining symbol-representing outputs on the basis of the combination of polarities of outputs of the three phase detectors.

9. In a unit as in claim 1, wherein the transmitter provides pilot tones accompanying and preceding the transmission of the modulated carrier, the modem including means for deriving a carrier reference from the pilot tones, the demodulator operating in response to said carrier reference.

10. In a unit as in claim 9, wherein the modem includes circuit means for deriving a symbol rate reference from the pilot tones.

11. In a unit as in claim 10, wherein the transmission of carrier modulated signals representing ternary digit groups is preceded by transmission of alternatingly modulating the carrier by two different phases at symbol rate; and wherein the circuit means for deriving includes means (a) for deriving a relatively high frequency signal from the pilot tones; a counter for counting the high frequency signal down to symbol rate frequency; means (b) for detecting the said alternating phases of the control information; means (c) for adjusting the count down of the high frequency to obtain a particular phase of detection by the means (a); and means (d) for deriving a sampling signal from the adjusted counter for obtaining said demodulation.

12. In a unit as in claim 9, wherein the means in the modem includes means (a) for deriving a relatively high frequency signal from the pilot tones; a counter for counting the high frequency signal down to carrier frequency and deriving therefrom a particular reference; means (b) for detecting said particular phase of the control information in relation to the particular reference; and means (c) for setting and resetting the counter so that the particular reference has a particular relation to the particular phase as detected, the relative phase of the particular reference being maintained during demodulation of data.

13. In a unit as in claim 12, wherein the means (b) includes first and second phase detectors respectively attuned to two different phases symmetrically displaced relative to the particular phase to provide oppositely changing outputs when the phase ae detected appears to deviate from the particular reference because of incorrectly adjusted phase of the particular reference.

14. In a unit as in claim 1, the buffer including:

a first register means and a second register means and for receiving digital data and for withdrawal of digital data;

first control means for alternatingly connecting the first and second register means respectively to the encoder and to the storage unit for receiving data from the encoder, and for withdrawing and feeding the received and withdrawn data to the recording unit for recording therein;

second control means for alternatingly connecting the first and second register means respectively to the storage unit and to the modem, for receiving from the storage unit reproduced data and feeding the received and withdrawn data to the modem;

third control means for alternatingly connecting the first and second register means respectively to the modem and to the storage unit for receiving from the modem demodulated data and feeding the received and withdrawn data to the storage unit for recording; and fourth control means for alternatingly connecting the first and second register means respectively to the storage unit and to the decoder for receiving from the storage unit reproduced data and for feeding the received and withdrawn data to the decoder for the decoder to provide the control signals.

15. In a unit as in claim 1, the modem having a plurality of phase detectors, each providing an output in response to any of the phase modulated carrier signals, and circuit means for logically combining the outputs of all said phase detectors to determine which one of the phases is present in the modulation.

16. In a unit as in claim 15, the modem including means for determining whether the carrier signal as received has amplitude so that the outputs of all phase detectors are below half scale value.

17. In a system for processing video signals for purposes of compression, the combination comprising:

first means for converting the video signals into a train of bi-valued bits wherein bits of a first value represent white or light image increments and bits of the opposite value represent black or dark image increments;

second means connected to the first means and counting the number of continuous bits of the same value and providing a stream of count numbers, separately in two channels for counted bits of opposite values, so that the numbers follow in a continuous sequence in the two channels and distinguish alternatingly in the two channels; and third means connected to receive the bits of the two channels and converting them in a stream of symbols using at least one bit per channel in parallel for generating representation of the symbols.

18. In a system as in claim 17, wherein the third means includes a phase modulator to convert one bit per channel or two bits per channel into seven different phase modulations of a carrier frequency, one at a time and for a fixed symbol period.

19. In a system as in claim 18, wherein the seven different modulations are comprised of six modulations 60° apart from each other, the seventh being a zero level signal.

20. In a system as in claim 17, and including storage means for temporarily storing the count numbers in two separate storage channels until the video signal has been completely received by the first means; and means for obtaining retrieval of the stored count numbers and providing the retrieved numbers to the third means.

21. In a system as in claim 20, including means for phase modulating a carrier in accordance with said symbols and for transmitting the symbol modulated carrier.

22. In a system for transmitting data in compressed format and which includes a pick-up to provide a train of two level signals and a reproduction unit operating in response to a train of control signals to obtain reproduction of the two level signal, further having a transmitter for transmitting modulated carrier signals and a receiver for receiving such signals; comprising:

first means for converting the two level signals into a sequence of run length numbers represented by a train of ternary digits;

second means connected for converting the train of ternary digits into a stream of symbols represented by electrical signals permitting distinction among plural symbols wherein one or two consecutive ternary digits appear as one distinct symbol in the stream depending on the value of the digit or digits;

third means for causing the transmitter to transmit the symbols to be received by the receiver;

fourth means for converting a stream of received symbols into a train of ternary digits; and sixth means for interpreting the train of ternary digits as provided by the fifth means as a sequence of run length numbers and providing a sequence of control signals for obtaining said reproduction of the two level signal.

23. In a system as in claim 22, wherein the pick-up is a facsimile pick-up device, the reproduction unit providing for a facsimile reproduction.

24. In a system as in claim 22, and including a first storage means for the ternary digits for storing them prior to transmission, and a second storage means for storing the ternary digits as converted by the fourth means prior to said reproduction.

25. A system for compressing data represented by or converted into a stream of two level signals, where signal portions of the first level are followed respectively by signals of a second level and vice versa, comprising:

first means for alternatingly counting the length of runs of signal portions of the two levels as they are alternatingly presented and setting the count numbers arrived at by counting run length of signals of the first level into a first channel and setting count numbers arrived at by counting run length of signals of the second level into a second channel, respectively with zero bits being set into the second and first channels accompanying each count bit in the first and second channels;

second means connected to the first means for processing bit pairs as presented concurrently in the first and second channels to obtain modulation control signals, distinguishing among different modulations in excess of two to modulate a carrier frequency accordingly; and means for transmitting the modulated carrier.

26. In a system as in claim 25, and including:

buffer means including a first pair and a second pair of registers connected alternatingly to the first and to the second channel so that the registers of each pair respectively receive said count numbers in alternating sequence as to the first and second pair; and storage means alternatingly connected to the second and first pair of registers for extracting therefrom the bits as respectively previously received from the first means for temporarily storing these signals.

27. In a system as in claim 25, wherein the second means provides phase modulation at six different phase levels plus off.

28. In a system as in claim 27, the second means includes:

first circuit means connected to receive the carrier for generating three differently phased signals;

second circuit means for gating the three differently phase signals;

third circuit means for summing the signals as gated by the second circuit means;

fouth circuit means for selectively inverting the gated signal; and means for controlling the second and fourth circuit means in response to said modulation control, the output of the fourth circuit means being transmitted.

29. A system for compressing data represented by or converted into a stream of two level signals, where signal portions of the first level and vice versa, comprising:

first means for alternatingly counting the length of runs of signal portions of the two levels as they are alternatingly presented and setting the count numbers arrived at by counting run length of signals of the first level into a first channel and setting count numbers arrived at by counting run length of signals of the second level into a second channel, respectively with zero bits being set into the second and first channels accompanying each count bit in the first and second channels;

buffer means including a first pair and a second pair of registers connected alternatingly to the first and to the second channel so that the registers of each pair respectively receive said count numbers in alternating sequence as to the first and second pair;

storage means alternatingly connected to the second and first pair of registers for extracting therefrom the bits as respectively previously received from the first means for temporarily storing these signals; and circuit means connected to the storage means and obtaining retrieval of said bits and causing them to be transmitted.

30. A system as in claim 29, said storage means including a movable storage carrier moving in one direction for storing the signals from the first means, and moving in the opposite direction during said retrieval.

31. A system for transmitting data developed as two level source data wherein runs of a first signal level are respectively followed by runs of a second signal level and necessarily vice versa, comprising:

counting means for counting the lengths of said runs and providing the count numbers in sequence of ternary bits for identifying therewith each number as to the type of level it represents as to length of a run thereof;

modulating means connected to receive said ternary bits and phase modulate a carrier on a seven level basis, six phases plus off, in accordance with groups of one or two consecutive bits;

means for transmitting the said modulated carrier;

means for receiving the said transmitted modulated carrier;

demodulating means responsive to the received transmitted modulated carrier and including first circuit means particularly responsive to particular ones of the phase modulations to provide plural outputs differing in amplitude from the different phase modulations, further including several circuit means responsive to said plural outputs to provide demodulation outputs depending on the combination in values of the plural outputs; and means responsive to the demodulation outputs to reconstruct said two level data.

32. In a system for transmitting facsimile signals comprising:

first means for generating a stream of digits defining the lengths of consecutively scanned runs of white and runs of black as detected in alternating sequence, and providing such digits at a variable rate;

second means connected to the first means and being responsive to particular values of digits individually and of the values of digits of groups of digits in said stream as generated by the first means, and including means (a) for providing signals representing distinguishable symbols as representing individual groups of digits of particular values and individual digits for at least one value thereof and including means (b) to provide a stream of symbols at a constant rate, wherein at least one of the symbols represents a digit of particular value and other symbols represent groups of digits of particular value combinations, so that the symbols as provided at a constant rate represent a digit flow at a variable rate; and third means connected to the second means for transmitting the symbols at the constant symbol rate.

33. In a system as in claim 32, the third means providing phase modulation of a carrier frequency for a predetermined frame period per symbol corresponding to said symbol rate.

34. In a system as in claim 33, wherein seven different symbols are represented by six different phases for modulation plus no signal as seventh symbol.

35. In a system as in claim 34, wherein the second means provides for six different symbols of two digits each, and a seventh symbol for a single digit.

36. In a system as in claim 32, wherein the digits are ternary digits.

37. In a system as in claim 36, the first means providing the ternary bits in two channels each holding bi-valued bits and in parallel as to the two channels, the ternary bits differing by bi-valued bit combinations in parallel.

* * * * *